Oct. 5, 1954   W. S. OLIWA   2,691,127
OVERLOAD CONTROL MEANS FOR MOTORS
Filed Sept. 6, 1950

INVENTOR
WALTER S. OLIWA
BY
ATTORNEY

Patented Oct. 5, 1954

2,691,127

UNITED STATES PATENT OFFICE 2,691,127

OVERLOAD CONTROL MEANS FOR MOTORS

Walter S. Oliwa, Orange, N. J., assignor to Monroe Calculating Machine Company, Orange, N. J., a corporation of Delaware Application September 6, 1950, Serial No. 183,399

5 Claims. (Cl. 318—462)

1

The invention relates to circuit control means for an electric motor whereby protection is afforded against damage from overloading, and it is the purpose of the invention to provide an inexpensive, simple, and yet positive means of affording such protection.

In accordance with the invention, a relay is initially energized to close the motor circuit upon closure of a starting switch. Means are interposed in the starting circuit to inhibit the current flow to the relay after an interval of time which is sufficient for the motor to reach its operating speed. A centrifugal switch is adapted to shunt the means which inhibits the current flow in the relay circuit when the motor reaches operating speed. The relay therefore remains effective to maintain the motor in operation as long as a critical operating speed is maintained. If, however, an overload should occur, such as may be caused by a bind in machinery operated by the motor, the shaft speed of the motor will decrease below a critical level and the centrifugal switch will be opened, thereby breaking the shunting circuit of the relay. The relay will again be energized for a given interval of time by the starting circuit, but should the motor speed remain below the critical level, the starting circuit will be inhibited or blocked after the given interval of time, the relay deenergized, and the motor circuit broken.

The invention, however, will best be understood from the following description with reference to the accompanying drawings in which.

Figure 1:
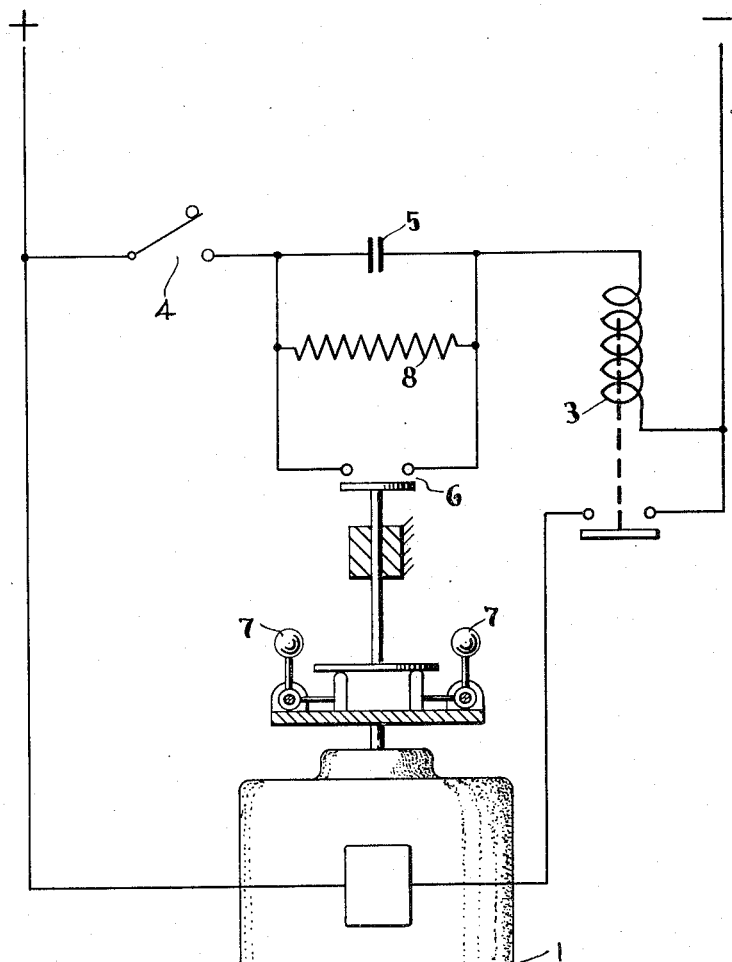
Fig. 1 is an electrical schematic of the circuit control means and its application to a motor operating on direct current.

The motor 1 is connected to either the direct or alternating current source upon closure of a relay 3 and the control devices will be described first as operating with the direct current source with reference to Fig. 1. The relay 3 is connected across the power source in series with a condenser 5 and a starting switch 4. Upon closure of switch 4, a current is established in the condenser and relay series circuit, thereby energizing relay 3. Thus, relay 3 is operated to close its contacts and connect motor 1 to the power source.

After a time interval which is a function of the capacity of condenser 5, the resistance of relay 3, sensitivity and applied voltage, condenser 5 will charge to a voltage opposing the applied voltage. The relay current will therefore progressively decrease until a point is reached where relay 3 would drop out and disconnect motor 1 from the power source, but for means normally intervening to maintain effective current flow to the relay. In normal operation, motor 1 will have accelerated to or above what may be termed a critical operating speed before the current flow in the relay series circuit has decreased to the aforenoted ineffective point. Therefore, means are provided to shunt blocking condenser 5 when the motor has reached its critical operating speed, thereby maintaining relay 3 effectively energized and the motor in operation. Such shunting means comprises a centrifugally operated switch 6 which is moved to closed position upon outward movement of weights 7 when the motor reaches its operating speed. The application of such centrifugally operated switching means is well known in the art and may be of any suitable construction. Upon opening of starting switch 4 the circuit to relay 3 will be broken and the relay contacts will open to disconnect and stop the motor.

If a bind occurs after the motor has started and is running normally with relay 3 energized by the circuit through shunting switch 6 and the bind causes the motor speed to decelerate below the operating level, the centrifugally held switch 6 will be opened, thereby removing the shunt from condenser 5. Condenser 5, which will have been discharged upon closure of switch 6, will start to charge as described in the initial starting operation and relay 3 will remain effectively energized through the condenser and relay series circuit. If, however, switch 6 is not reclosed by reacceleration of the motor, condenser 5 will be effective to reduce the current flow to relay 3 to a point where it will drop out, thus disconnecting and stopping the motor before it is damaged by the overload.

In case of a bind existing before the closure of starting switch 4, condenser 5 will begin to charge upon closure of the switch and relay 3 will be energized to close its contacts and start the motor as heretofore described. The existence of the bind, however, will prevent the motor from reaching its operating speed and closing switch 6 to shunt condenser 5. Therefore, when condenser 5 is sufficiently charged to reduce the flow of current to relay 3, the relay will open and stop the motor before it is damaged by the overload.

If the motor has been stopped by the safety control devices, switch 4 will be closed and condenser 5 will be charged. When switch 4 is opened the charge would leak off from condenser 5 after a period of time, but until this occurred the condenser would be ineffective to pass current upon reclosure of the switch. Therefore, a high resistance 8, across the condenser, permits the condenser to discharge upon opening of switch 4 so that the switch may be reclosed without delay and thereupon condenser 5 will be effective to pass current to energize relay 3 and start the motor.

Figure 2:
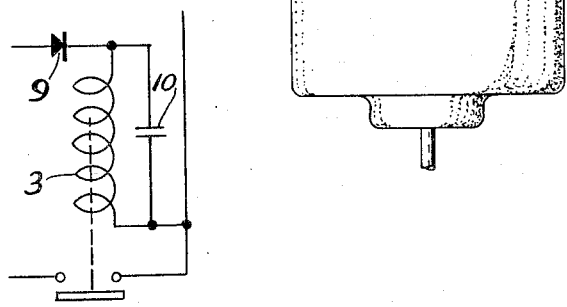
Fig. 2 is a fragmentary electrical schematic showing additional elements necessary to the circuit control means when applied to a motor operating on alternating current.

In applying the circuit control devices to a motor operating from an alternating current source, it is only necessary to insert a rectifier 9 in the circuit between condenser 5 and relay 3 and to connect a condenser 10 across the relay as shown in Fig. 2. During passage of the current by the rectifier to energize relay 3 during the one-half cycle of the alternating current, condenser 10 will be charged and during the other half cycle condenser 10 will be discharged through the relay, thereby maintaining it continuously energized.

In a practical application of the circuit control devices herein disclosed in which a 1/25 horsepower motor was operated from a 110 volt power source, satisfactory results were obtained with condenser 5 rated at 3 mfd.; relay 3, 10,000 ohms; resister 8, 1 megohm; and condenser 10, .05 mfd. These ratings, however, only illustrate a specific application of the circuit control means and the various ratings are determined by the type of motor, its accelerating rate, the power source, and circuit characteristics. It will be understood, therefore, that the invention is not to be restricted to the specific application herein disclosed.

I claim:

1. In combination, a motor, a circuit for said motor, a relay for controlling said motor circuit, a circuit for said relay including a switch, a condenser in said relay circuit, a switch operable to shunt said condenser, and centrifugal means operable by the motor upon acceleration to and deceleration below a given rotational speed respectively to close and to open said shunting switch.

2. The combination according to claim 1 having a resistor across the condenser.

3. In combination, a motor, a direct current supply source therefor, a circuit for said motor, a relay for controlling said motor circuit, a circuit including a switch for said relay in parallel with said motor circuit, a condenser in said relay circuit, a switch operable to shunt said condenser, and centrifugal means operable by the motor upon acceleration to and deceleration below a given rotational speed respectively to close and to open said shunting switch.

4. The combination according to claim 3 having a resistor across the condenser.

5. In combination, a motor, an alternating current supply source therefor, a circuit for said motor, a relay for controlling said motor circuit, a circuit including a switch for said relay in parallel with said motor circuit, a condenser in said relay circuit, a rectifier in said relay circuit, a condenser across said relay, a switch operable to shunt the first said condenser, and centrifugal means operable by the motor upon acceleration to and deceleration below a given rotational speed respectively to close and to open said shunting switch.

References Cited in the file of this patent

UNITED STATES PATENTS

| Number | Name | Date |
| --- | --- | --- |
| 1,737,358 | Cooper | Nov. 26, 1929 |
| 2,250,141 | Thurston | July 22, 1941 |
| 2,484,781 | Coffey | Oct. 11, 1949 |